April 9, 1963

A. TROPIANO 3,084,819

WHEEL TIRE LIFT

Filed April 18, 1960

*INVENTOR.*
ANTHONY TROPIANO
BY Alfred E. Miller
*ATTORNEY*

United States Patent Office 3,084,819
Patented Apr. 9, 1963

3,084,819
WHEEL TIRE LIFT
Anthony Tropiano, 2 Lucy St., Byram, Conn.
Filed Apr. 18, 1960, Ser. No. 22,814
1 Claim. (Cl. 214—334)

The present invention relates to a tire lift and more particularly to a device for mechanically elevating a vehicle wheel to a position whereby the wheel may be easily mounted on the vehicle axle.

Heretofore, it has been physically hard to change a tire especially on a truck or other vehicle using large tires. The lifting of a large tire to its position on the axle of a jacked up vehicle is an exhausting duty. This difficult operation can be substantially diminished by using a tire lift device constructed in accordance with the present invention.

An object of the present invention is to provide a tire lift device which is easy to operate, inexpensive to manufacture and is effective for the purposes intended.

Another object of the present invention is to provide a rolling tire lift device which is universally adapted for accommodating a wide variety of vehicle tires and which, by the application of a minimum amount of force, permits heavy wheels to be lifted to a position for mounting the same on an axle.

It should be apparent that the present device may be used for lifting a variety of objects, for example, sheet-rock or plywood sheets in construction work.

The above and other features, objects and advantages of the present invention will be fully understood from the following description considered in connection with the accompanying illustrative drawings.

Figure 1:
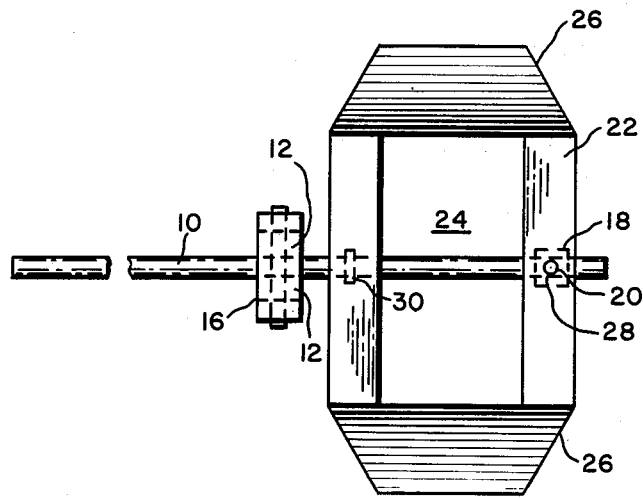
Figures 2, 4:
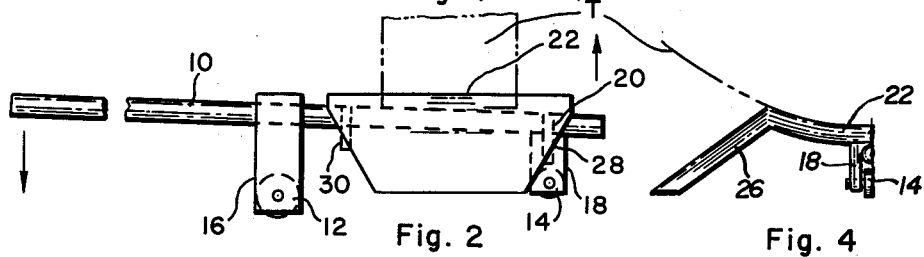
Figure 3:
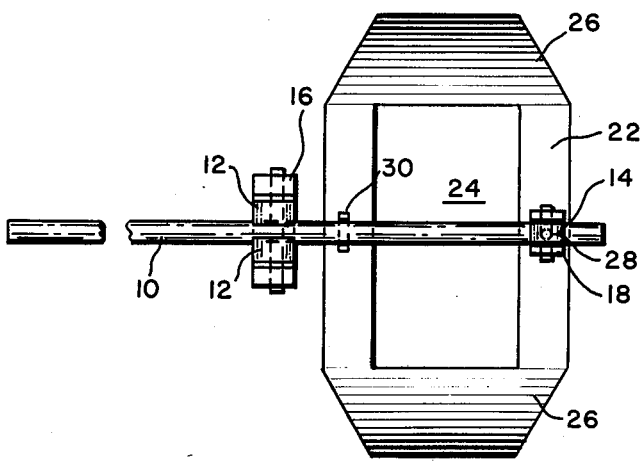

FIG. 1 is a top plan view of the tire lift device constructed in accordance with the teachings of my invention, FIG. 2 is a side elevation view thereof, FIG. 3 is a bottom plan view of the device, and FIG. 4 is a partial front elevation view of part of the device.

Referring to the drawings, the present invention comprises a tire lift device having an elongated bar 10 to which are attached wheels 12 and 14 by means of U-shaped brackets 16 and 18 respectively. U-shaped bracket 16 is fixed to the top side of bar 10 by welding or any other suitable manner while U-shaped bracket 18 is similarly secured to the bottom side of bar 10. It should be noted that the legs of the U-shaped brackets 16 and 18 respectively project downwardly and transverse to the central axis of the bar 10. The bar 10 is provided with an aperture 20 in the front end thereof.

Removably seated on top of bar 10 is a substantially flat, rectangular plate 22 having a cut-out portion 24 of a size to receive a vehicle tire. The plate 22 incorporates downwardly sloping side portions 26 up which a vehicle tire can be rolled into the position in which the same is seated in cut-out portion 24 of the plate 22. Affixed to the underside of plate 22 is a downwardly projecting pin 28 on one side of cut-out portion 24 while a relatively small U-shaped bracket 30 is secured to the plate 22 on the opposite side of the cut-out portion 24. Thus, plate 22 may be removably placed on bar 10 by means of pin 28 being insertable in aperture 20 of bar 10 and U-shaped bracket 30 straddling the bar 10.

It should be noted that normally the wheels or rollers 12 are located at a level below the level of side portions 26 of plate 22 and wheels 14 as well as the bracket 18 so that the wheel 12 functions as a fulcrum when the end of the bar 10 remote from plate 22 is lowered by hand or foot to thereby elevate the tire T to the required position for mounting the same on a vehicle axle (FIG. 2).

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claim.

What I claim is:

A wheel lift comprising an elongated bar having a hole therein adjacent to one end thereof, a first roller means depending from a location adjacent to one end of said bar, a second roller means depending from an intermediate portion of said bar and in a lower plane than said first roller means, a relatively flat plate provided with an aperture, having its longest dimension substantially transverse to the longitudinal axis of said bar and sloping ramp portions on opposite sides of said aperture, and a U-shaped bracket secured to the underside of said flat plate and embracing a part of said bar and a pin depending from the underside of said flat plate introduced into said hole when said flat plate is inserted thereon whereby when a wheel is rolled up on one of said sloping ramp portions and into the aperture of said flat plate and a force is applied in a downward direction to the other end of said bar the bar pivots with said second roller means as a fulcrum and the wheel is elevated to the desired height.

References Cited in the file of this patent

UNITED STATES PATENTS

| | | |
|---|---|---|
| 2,135,802 | Dinkins | Nov. 8, 1938 |
| 2,321,602 | Jensen | June 15, 1943 |
| 2,613,084 | Burch | Oct. 7, 1952 |